(12) United States Patent
Funakoshi et al.

(10) Patent No.: US 6,401,207 B1
(45) Date of Patent: Jun. 4, 2002

(54) SECURITY DEVICE FOR VEHICLE

(75) Inventors: Hiroshi Funakoshi; Shuichi Yoneyama, both of Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/156,702

(22) Filed: Sep. 18, 1998

(30) Foreign Application Priority Data

Sep. 19, 1997 (JP) .............................. 9-255099

(51) Int. Cl.[7] .............................. H04L 9/00; H04L 9/32
(52) U.S. Cl. .................... 713/182; 713/200; 380/262; 380/264; 380/268; 705/13
(58) Field of Search .............................. 340/425.5, 426, 340/428; 307/10.2, 10.3, 10.5; 705/13, 63; 713/182, 200; 380/262, 264, 268, 273, 283, 46

(56) References Cited

U.S. PATENT DOCUMENTS

| 5,144,667 A | * | 9/1992 | Pogue, Jr. ................... 380/45 |
| 5,615,649 A | * | 4/1997 | Yung ........................ 123/146.5 |
| 5,619,573 A | | 4/1997 | Brinkmeyer et al. ........... 380/23 |
| 5,724,028 A | * | 3/1998 | Prokup ................... 340/825.31 |
| RE36,752 E | * | 6/2000 | Koopman, Jr. ................ 380/25 |
| 6,144,112 A | * | 11/2000 | Gilmore ..................... 307/10.2 |

FOREIGN PATENT DOCUMENTS

JP          7-309208         11/1995

* cited by examiner

Primary Examiner—Gilberto Barron, Jr.
Assistant Examiner—Paul Callahan
(74) Attorney, Agent, or Firm—McDermott, Will & Emery (57) ABSTRACT

A security device for vehicle disclosed is of a type generating a seed that is used suitably in order to generate a key by being encoded and that is decreased in regularity. Namely, the security device for vehicle according to the present invention has a construction that generates from vehicle control data the seed used for generating an authentication key on the vehicle side and a key on the user side by being encoded. By such construction, the seed is generated from the vehicle control data concerning the constituent elements of the vehicle that are kept in a state of operation. Since the vehicle control data itself is a type that momentarily changes in correspondence with the state of operation of the constituent elements of the vehicle, the generated seed exhibits substantially no regularity thereby becoming a very good kind of random number.

21 Claims, 4 Drawing Sheets

SECURITY DEVICE FOR VEHICLE

The contents of Japanese Application No. 9-255099 to Kuganhei, filed Sep. 19, 1997, are hereby incorporated by reference.

BACKGROUND OF THE INVENTION

1. Field of the Invention

The present invention relates to a security device for a vehicle and, more particularly, to a security device for a vehicle that releases the security of a vehicle control unit such as a power train control unit loaded on the vehicle with respect only to an authorized user such as an owner of the vehicle by the use of the vehicle control unit and the user side key unit.

2. Description of the Related Art

As a security device for a vehicle, there can be cited the one that is concerned with a theft prevention device (immobilizer) for a vehicle that has a construction of releasing the security of the vehicle control unit with respect only to an authorized user such as an owner of the vehicle and permitting the use of the vehicle, the one that is concerned with a diagnosis device for a vehicle that has a construction of releasing the security of the vehicle control unit with respect only to an authorized user such as a manufacturer of the vehicle and permitting the read-in of vehicle control data of the vehicle that is secret data, and the one that is concerned with a reprogramming tool for a vehicle control microcomputer of the vehicle that releases the security of the vehicle control unit with respect only to an authorized user such as a manufacturer of the vehicle and a supplier who has made a contract with such a manufacturer so as to permits the supplier to rewrite a vehicle control program of the vehicle.

Japanese Patent Application Laid-Open No. 7-309208 discloses a technique of constructing a security device for a vehicle by the use of a vehicle control unit having an encoding algorithm and a user side key unit having the same encoding algorithm.

Specifically, such vehicle control unit generates a seed that is a kind of random number, transmits the seed to the user side key unit, and encodes the seed by the use of a predetermined encoding algorithm to thereafter generate an authentication key.

On the other hand, the user side key unit receives the seed transmitted from the vehicle control unit, encode the seed by the use of the same encoding algorithm as that used by the vehicle control unit to thereby generate a key, and transmit the thus-generated key to the vehicle control unit.

Further, in the vehicle control unit comparison is made between an authentication key generated thereby and the key transmitted from the user side key unit. When the both key coincide with each other, the security of the vehicle control unit is released.

By such a constructing, the security of the vehicle control unit is released with respect only to a proper owner of the user side key unit.

However, in the above-described security device for the vehicle, in spite of the fact that both the authentication key generated by the vehicle control unit and the key generated by the user side key unit are generated by being encoded using the seed, no concrete disclosure is made of a method of generating such a seed that is an object to be encoded.

For example, if the seed that is generated has a level of regularity, it is considered that the possibility that the authentication key and the key will coincide with each other becomes high even if such a seed is fully encoded. This becomes an obstacle to realizing a high level of security performance in the security device for the vehicle.

SUMMARY OF THE INVENTION

An object of the present invention is to provide a security device for a vehicle that has a high level of security performance by reliably generating the regularity-decreased seed in a simple and convenient manner so that this seed can be suitably used in order to generate a key by encoding this seed.

Namely, the security device for the vehicle according to the present invention is so constructed as to generate the seed used for generating the authentication key (for example, the key becoming a reference for deciding the justness of a person trying to access the vehicle) and the key (for example, the key reflecting the information on the justness of the key) by this seed being encoded, from the vehicle control data each of that has a value that is different each time when the vehicle control data is read-in at an appropriate timing during operation of the constituent elements of the vehicle.

By such a construction, the seed is reliably generated from the vehicle control data concerning the constituent elements of the vehicle that during the operation of the vehicle are always kept in some or other state of operation.

Further, since such a vehicle control data itself changes momentarily in correspondence with the state of operation of the constituent elements of the vehicle, the seed that is generated exhibits no regularity and has also a very good nature regarded as like a random number.

More concretely, the security device for the vehicle according to the present invention has a first unit that generates an authentication key by encoding the seed in accordance with a predetermined algorithm and a second unit that generates a key by encoding the seed in accordance with the same algorithm as the above-described predetermined algorithm that is used when the first unit generates the authentication key.

Here, the seed is generated according to the vehicle control data.

It is to be noted that even when the vehicle is out of operation, it is possible that the seed is stored in each of the first unit and second unit on needs.

Then, when trying to operate the vehicle, comparison is made between the key generated by the second unit held by the user and the authentication key generated by the first unit that is loaded on the vehicle and, when these two keys coincides with each other, the security on the vehicle is released to thereby operate the vehicle and enable the running thereof.

Accordingly, by making collation between the authentication key and key that is encoded by the use of the seed exhibiting a very good level of random number nature, a high level of security of the vehicle is exhibited.

Further, specifically, the first unit is a vehicle control unit and this first unit comprises a reading portion that reads in a vehicle control data, a seed generating portion that generates a seed according to the vehicle control data read in by the reading portion, a transmitting portion that transmits the seed to a second unit, an authentication key generating portion that generates an authentication key by encoding the seed in accordance with a predetermined algorithm, a key receiving portion that receives a key from the second unit, and a correspondence deciding portion that compares the key received by the key receiving portion and the authentication key generated in the authentication key generating portion and, when these key coincides with each other, releases the security on the vehicle.

In this way, by an integrated construction of from the reading portion to the correspondence deciding portion, it is possible to generate a seed and thereby determine the coincidence between the key and authentication key by a compact construction simple to use.

Here, the second unit is a user side key unit and this second unit comprises a seed receiving portion that receives the seed transmitted from the transmitting portion of the vehicle control unit, a key generating portion that generates the key by encoding the seed received by the seed receiving portion in accordance with the same algorithm as the predetermined algorithm that is used in the authentication key generating portion of the vehicle control unit, and a key transmitting portion that transmits the key generated in the key generating portion to the key receiving portion of the vehicle control unit.

In this way, through an integrated construction of from the receiving portion to the key transmitting portion, it is possible to generate the key by the compact construction simple to use and transmit it to the vehicle control unit.

Also, it is preferable that the reading portion of the vehicle control unit reads in a plurality of vehicle control data and the seed generating portion generates the seed according to the plurality of vehicle control data read in by the vehicle data reading portion because this enhances the random number-like nature of the seed and as a result enhances the security level of the vehicle.

Here, specifically, the seed generating portion adds up the seed generated at the time of the previous vehicle operation and the plurality of vehicle control data that is read in by the reading portion to thereby newly generate a seed having substantially no regularity on a reliable basis.

Also, the vehicle control unit is a power train control unit and the vehicle control data that is read into the reading portion is at least one of an engine revolutions number, sucked air amount, throttle opening and water temperature.

Here, the power train control unit means a control unit that can control an engine control unit singly, or a transmission control unit singly, or both of the engine control unit and the transmission control unit synthetically.

According to such a construction, the security device for the vehicle according to the present invention has a simple and convenient construction that is integral with the power train control unit. Further, because the engine control data such as an engine revolutions number are the values that irregularly change and reliably exist, these data are suitable for use in the generation of a seed.

Also, the vehicle control unit is a power train control unit and the vehicle control data that is read into the reading portion may include the counted time value of a so-called "free run timer" that is counted until the ignition switch is changed over to "off" after this switch was made "on". Therefore, even if the ignition key has been operated repeatedly, the level of security becomes high. It is to be noted that such counted time value corresponds to the "on" time duration of the ignition switch and therefore shall be a kind of control data of the vehicle.

Also, the vehicle control unit is a power train control unit and the vehicle control data that is read into the vehicle data reading portion may include an amount of fuel injection and/or ignition energy. Such engine control output data can be suitably used as in the case of the engine control input data such as an engine revolutions number.

Meanwhile, the security device for the vehicle according to the present invention is possibly constructed as an immobilizer that compares the key generated by the second unit and the authentication key generated by the first unit and, when these data coincides with each other, brings the vehicle to an operable state.

Also, the security device for the vehicle according to the present invention is possibly constructed as a diagnosis device for the vehicle that compares the key generated by the second unit and the authentication key generated by the first unit and, when these data coincides with each other, brings the vehicle to a state where the vehicle control data is readable.

Also, the security device for the vehicle according to the present invention is possibly constructed as a reprogramming tool that compares the key generated by the second unit and the authentication key generated by the first unit and, when these data coincides with each other, brings the vehicle to a state where the vehicle control program is rewritable.

Further, in other words, the security device for the vehicle according to the present invention can be said as having a construction that comprises seed generating means that generates a seed according to the vehicle control data, authentication key generating means that generates an authentication key by encoding the seed in accordance with a predetermined algorithm, key generating means that encodes the seed in accordance with the same algorithm as the predetermined algorithm that is used when the first authentication key generating means generates the authentication key to thereby generate a key, and correspondence deciding means that compares the key and the authentication key to thereby decide whether these data are in coincidence with each other, whereby when the correspondence deciding means decides that the key and the authentication key are in coincidence with each other, the security that concerns the vehicle is released.

DETAILED DESCRIPTION OF THE PREFERRED EMBODIMENT

An embodiment of the present invention will now be explained in detail while referring to the drawings.

Figure 1:
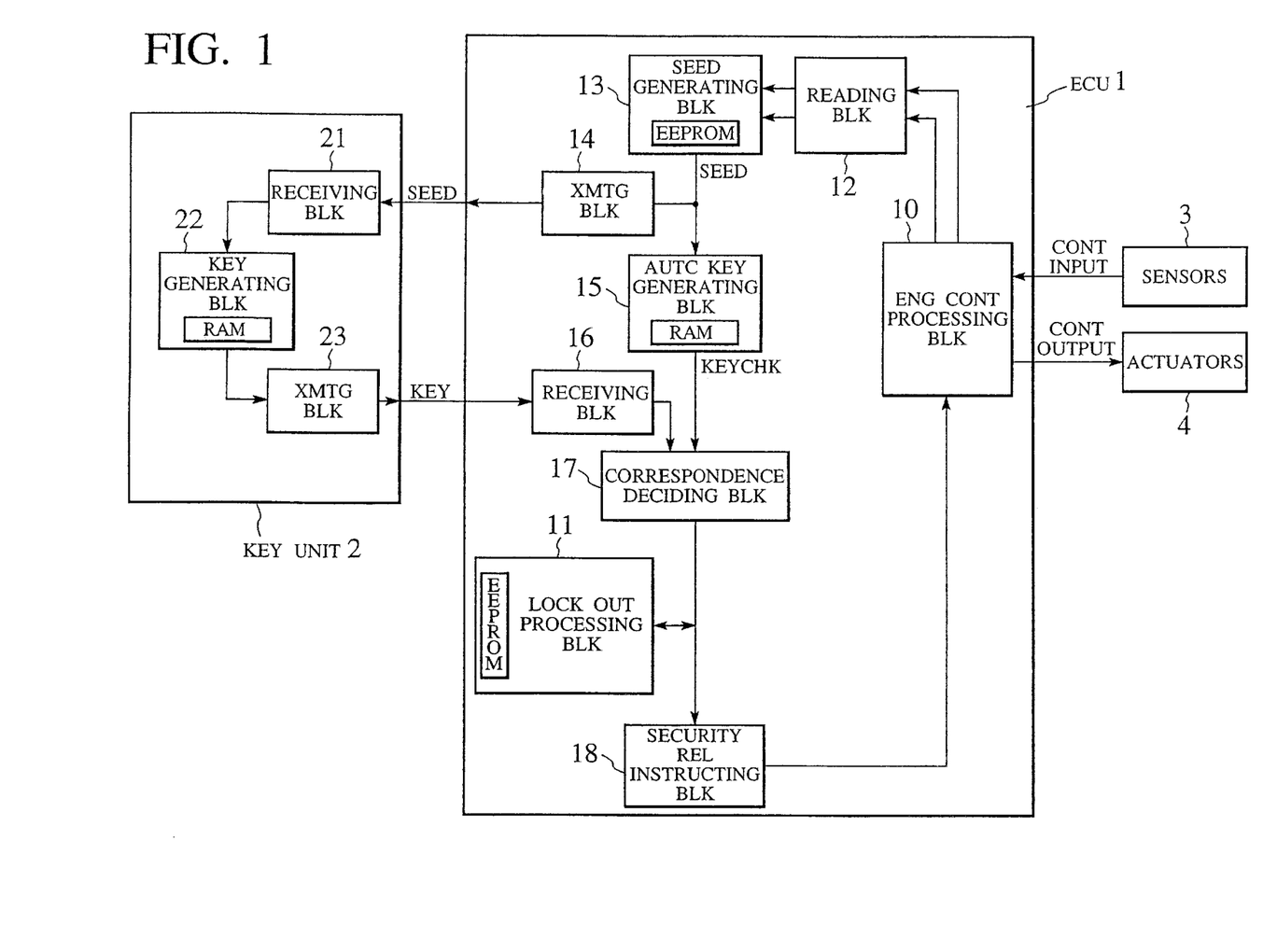
FIG. 1 is a block diagram schematically illustrating a security device for vehicle according to the present invention.

FIG. 1 is a block diagram illustrating a security device for a vehicle according to the embodiment of the present invention, the block diagram showing an example wherein the present invention has been applied to a theft prevention device (immobilizer) of a vehicle.

In FIG. 1, the security device for the vehicle according to this embodiment is comprised of a vehicle control unit 1 and a user side key unit 2.

Specifically, in this embodiment, under the assumption that the vehicle control unit 1 be, by way of example, an engine control unit (ECU), an explanation will hereafter be given by taking up the ECU 1 as an example.

In the ECU 1, there is provided an engine control processing portion 10 as shown ENG CONT PROCESSING BLK. To this engine control processing portion 10 there are inputted the control input data from various sensors 3 such as a crank angle sensor, air flow meter, throttle sensor, and water temperature sensor of the engine, for example. Then, the engine control processing portion 10 executes its calculation process of the thus-inputted control input data through the operation of its CPU and sends out control output data to various actuators 4 such as an injector and an igniter, for example, of the engine that are the object to be controlled. It is to be noted that the engine control processing portion 10 is also equipped with memories (ROM, RAM) for storing therein programs necessary for execution of the calculation process and data regarding the control input and output data, for example. This processing portion 10 is provided as a portion of the ECU 1 at a place within the vehicle that is difficult to access.

Figure 2:
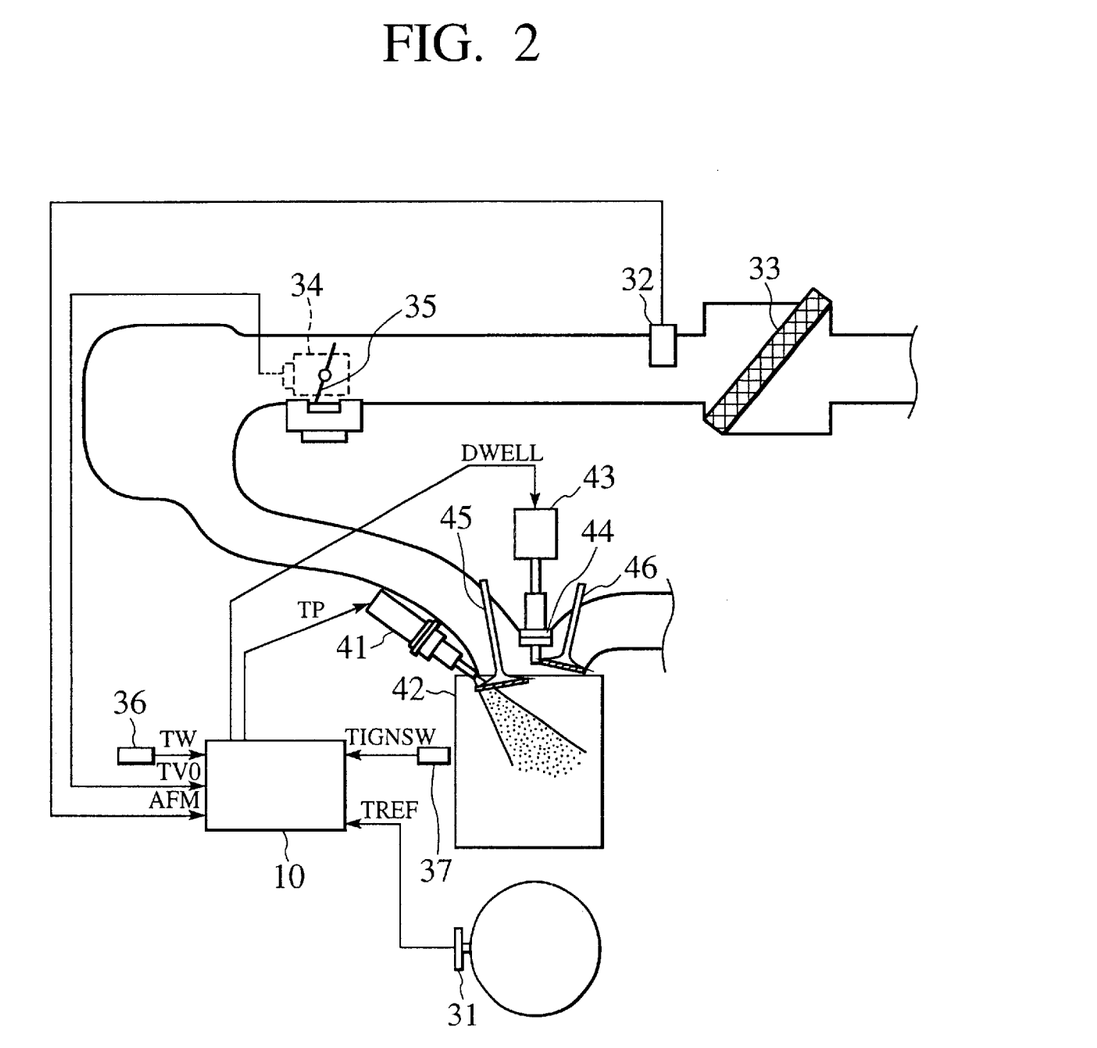
FIG. 2 is an illustration of a sensor and actuator of the security device for vehicle according to the present invention.

FIG. 2 is a view illustrating a more detailed construction of this embodiment that is established among various sensors, various actuators and the engine control processing portion 10.

In FIG. 2, as the sensors for detecting the control input data of the engine control data there are provided a crank angle sensor 31 for detecting the number of revolutions of the engine, an air flow meter 32 that is located on the downstream side of an air cleaner 33 and intended to detect the amount of sucked air for the engine, a throttle sensor 34 for detecting a throttle opening from the opening of a throttle valve 35, a water temperature sensor 36 for detecting the temperature of the cooling water for the engine, and a free run timer 37 for measuring the time duration that covers from the "on" operation to the "off" operation of an ignition switch.

Further, in FIG. 2, as the actuators to which control output data of the engine control data are outputted there are provided an injector 41 for injecting a fuel to within a cylinder 42 and an igniter 43 that is communicated with an ignition plug 44 that is disposed between a suction air valve 45 and an exhaust valve 46.

Here, explaining the control input data more concretely, the control input data from the crank angle sensor 31 is an engine revolutions number TREF that is obtained in correspondence with the period of a signal that is generated for each predetermined reference crank angle, the control input data from the air flow meter 32 is the amount of sucked air AFM, the control input data from the throttle sensor 34 is a throttle opening TVO, the control input data from the water temperature sensor 36 is a water temperature TW, and the control input data from the free run timer 37 is a counted time value TIGNSW (ON→OFF) that covers from the "on" operation to the "off" operation of the ignition switch.

Further, the control output data with respect to the injector 41 is a fuel injection pulse width TP that corresponds to the amount of fuel injection while, on the other hand, the control output data with respect to the igniter 43 is an ignition pulse width DWELL that corresponds to the ignition energy.

It is to be noted that each of the control input and output data in this embodiment is a 16-bit data.

Meanwhile, referring again to FIG. 1, the ECU 1 of this embodiment is further equipped with a lock-out processing portion 11 as shown LOCK OUT PROCESSING BLK that decides whether the ECU 1 is locked out and executes a lock-out operation, a reading portion 12 of the engine control data as shown READING BLK to which the control input data and the control output data, i.e. engine control data is inputted and which reads the engine control data in, a seed generating portion 13 as shown SEED GENERATING BLK that generates the seed SEED according to the engine control data that is thus read in, a transmitting portion 14 as shown XMTG BLK that sends out the thus-generated seed SEED to the outside, an authentication key generating portion 15 as shown AUTC KEY GENERATING BLK that encodes the thus-generated seed SEED in accordance with a predetermined encoding algorithm to thereby generate an authentication key KEYCHK, a receiving portion 16 as shown RECEIVING BLK that receives the key KEY inputted from the outside and in addition decides that this key is received, a correspondence deciding portion 17 as shown CORRESPONDENCE DECIDING BLK that compares the thus-generated authentication key KEYCHK and the received key KEY to thereby decide whether these data are in coincidence with each other and a security release instructing portion 18 as shown SECURITY REL INSTRUCTING BLK that when it is decided in the correspondence deciding portion 17 that the authentication key KEYCHK and the key KEY are in coincidence with each other instructs the release of the security by the ECU 1.

Here, the lock-out processing portion 11 is provided with a memory (EEPROM) that stores therein a flag that indicates a state of lock-out of the vehicle, the seed generating portion 13 is provided with a memory (EEPROM) that stores therein the seed that is generated thereby, and the authentication key generating portion 15 is provided with a memory (RAM) that stores therein the authentication key that is generated thereby. Of course, if holding the authentication key during the unoperated state of the vehicle is required, an EEPROM as a memory is possibly provided singly or in a form combined with the RAM for storing the generated authentication key.

Additionally, in the ECU 1 of this embodiment, the portions covering from the engine control processing portion 10 to the security release instructing portion 18 are loaded on an electric board that is within a rigid casing installed within the vehicle. Of course, more preferably, these portions can be integrated with each other and can be constructed as a functional element of one chip.

On the other hand, the user side key unit 2 can transmit and receive a signal appropriately between the ECU 1 constituting the vehicle control unit in this embodiment and this user side key unit 2. Namely, the user side key unit 2 serves as a so-called tranponder with respect to the vehicle control unit 1 and, when the user has the intention of using the vehicle, is carried with this user integrally with the key or separately therefrom.

More specifically, the user side key unit 2 comprises a receiving portion 21 as shown RECEIVING BLK that receives the seed SEED transmitted from the transmitting portion 14 of the ECU 1 and thereby decides the reception of this seed, a key generating portion 22 as shown KEY GENERATING BLK that encodes the received seed SEED by the use of an encoding algorithm as same as the encoding algorithm that is used when the authentication key generating portion 14 of the ECU 1 generates key KEY and a transmitting portion 23 as shown XMTG BLK that transmits the thus-generated key KEY to the receiving portion 15 of the ECU 1.

Here, the key generating portion 22 is provided with a memory (RAM) for storing therein the generated key.

Further, by combining the above-described ECU 1 constituting the vehicle control unit and the above-described user side key unit 2, it becomes possible to release the security of the ECU 1 with respect only to an authorized user such as an owner of the vehicle. More specifically, the security device for vehicle according to this embodiment functions as a vehicle theft prevention device (immobilizer) that enables such an authorized user only to operate the vehicle, namely, enables permitting the use of the vehicle.

It is to be noted that in the user side key unit 2 according to this embodiment the portions covering from the receiving portion 21 to the transmitting portion 23 are integrated as a one-chip functional element.

Figure 3:
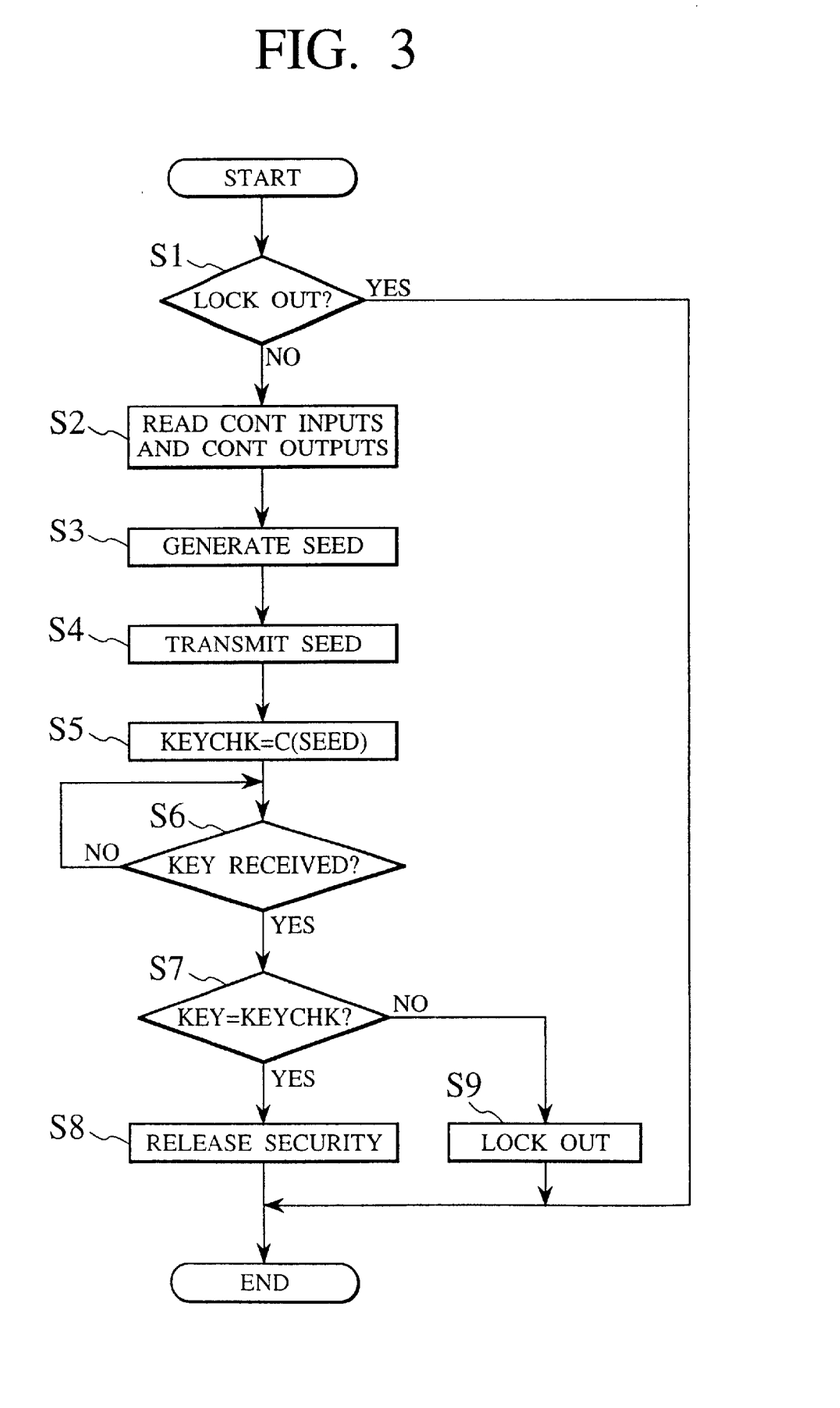
FIG. 3 is a flow chart illustrating a calculation process that is executed in a vehicle control unit of the security device for vehicle according to the present invention; and, FIG. 4 is a flow chart illustrating a calculation process that is executed in a user side key unit of the security device for vehicle according to the present invention.
Figure 4:
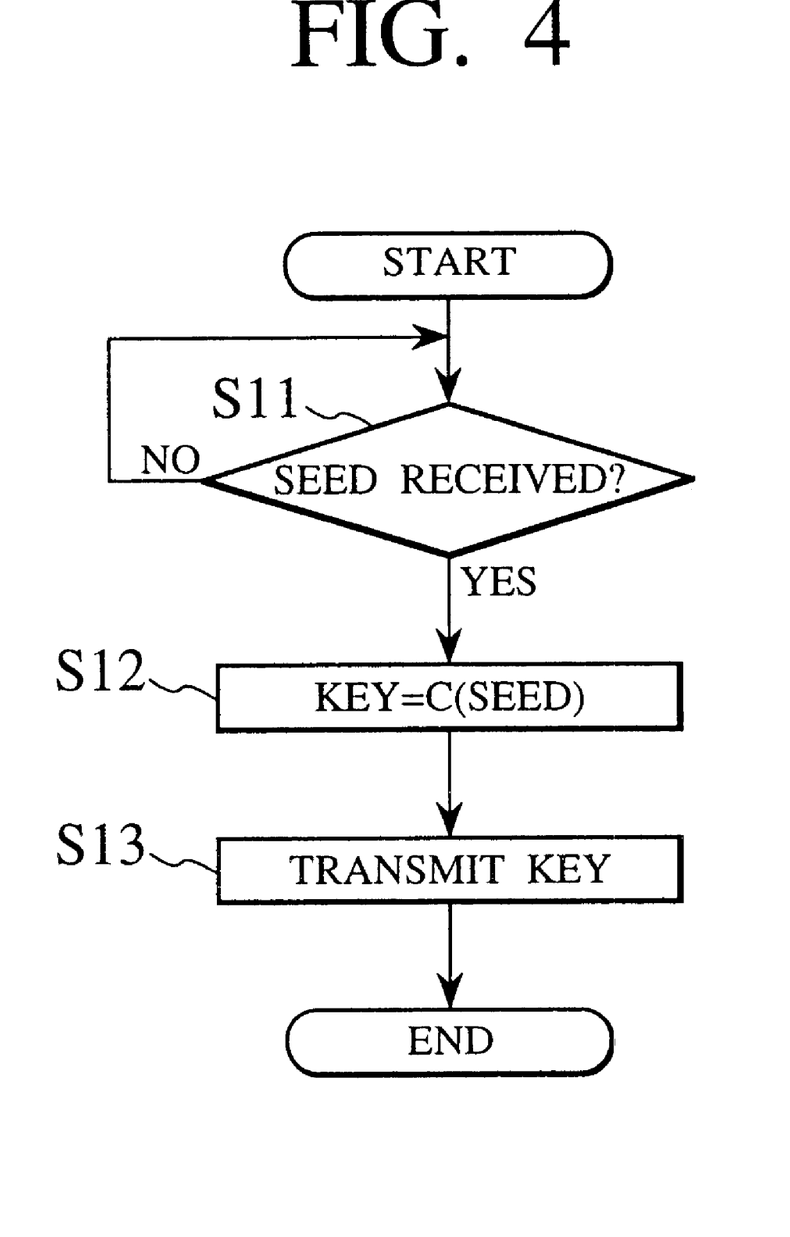

The contents of the respective calculation processes executed in the ECU 1 and user side key unit 2 according to this embodiment will hereafter be explained in detail further with reference to FIGS. 3 and 4.

In FIG. 3 that illustrates a flow chart of the calculation process for security control of the ECU 1 according to this embodiment, first, such security process starts at the point in time when the ignition switch key has been changed over from "off" to "on".

Upon start of the security process, in step S1, the lock-out processing portion 11 decides whether the vehicle is being locked out. Specifically, that the vehicle is being locked out is referred to as a state where the lock-out flag in the-memory (EEPROM) of the lock-out processing portion 11 is being "1" in correspondence with the attempt of a past improper security release for the vehicle.

When it is decided in step S1 that the vehicle is not being locked out, the processing proceeds to step S2.

Next, in step S2, the reading portion 12 of the ECU 1 sequentially reads there into various data constituting the engine control data that is the vehicle control data according to this embodiment, concretely, various data including the engine revolutions number TREF from the crank angle sensor 31 of the engine, the amount of sucked air AFM from the air flow meter 32, the throttle opening TVO from the throttle sensor 34, the water temperature TW from the water temperature sensor 36, and the counted time value TIGNSW (ON→OFF) covering from the "on" operation to the "off" operation of the ignition switch that is supplied from the free run-timer 37, all of which are the control input data to the engine control processing calculation portion 10. Further, the reading portion 12 of the ECU 1 also reads there into the calculation data of the amount of fuel injection TP with respect to the injector 41 and ignition pulse width DWELL with respect to the igniter 43, both of which are the control output data from the engine control processing calculation portion 10.

Here, the timing with that such read-in operation is executed, regarding the control input data, is the point in time at that various control input data that have been measured by the respective sensors after the ignition switch has become "on" are read into the engine control processing portion 10. On the other hand, regarding the control output data, such timing is the point in time at that there is terminated the calculation for the control output data that is executed by the engine control processing portion 10 according to these control input data.

It is to be noted that, among the control input data, as the data TREF, AFM, TVO and TW there are used the most recent measured data and, as the data TIGNSW (ON→OFF) there are used the measured data that have been measured correspondingly to a case where the ignition switch had been made "on" and was made "off" at the previous time (at a time that precedes once), namely, the stored values. Further, as the respective control output data there are used the data TP and DWELL that are the most recent calculated values.

On the other hand, when it has been decided in step S1 that the vehicle is being locked out, the processings in step S2 and its thereafter succeeding steps are not executed, whereby the security process in the ECU 1 is terminated with the vehicle being locked out as is.

Next, if the reading-in processing in step S2 has been terminated, the seed generating portion 13 of the ECU 1 adds to the previously generated seed (previous SEED) the data TREF, AFM, TVO, TW, TIGNSW (ON→OFF), TP, and DWELL that are the read-in data constituting the engine control data and thereby generates a data SEED.

That is to say, concretely, the data SEED is obtained according to the following calculation expression. Here, the reason why the data TIGNSW (ON→OFF) is added is because in a case where the ignition switch was repeatedly made "on" and "off", it results that the data TIGNSW (ON→OFF), which are different in correspondence with the respective on/off times, are used and therefore a different data SEED is generated accompanied with the result that the security performance is enhanced by reflecting such a difference of the data SEED.

"SEED"="previous SEED"+"TREF"+"AFM"+"TVO"+ "TW"+"TIGNSW (ON→OFF)"+"TP"+"DWELL"

Then, the thus-generated data SEED is stored in the memory (EEPROM) within the seed generating portion 13.

It is to be noted that the previous SEED in step S3 is the data SEED that has been generated through the execution of the previous security process and, as an initial value thereof, there is used a data 0000H.

Next, the data SEED that has been generated in step S3 is transmitted from the transmitting portion 14 of the ECU 1 to the receiving portion 21 of the user side key unit 2 in step S4.

Next, in step S5, the authentication key generating portion 15 encodes the data SEED generated in step S3 by the use of the encoding algorithm to thereby generate the authentication key KEYCHK. As the encoding algorithm in this embodiment there has been adopted the encoding algorithm established by DES (Data Encryption Standard : the edition made by the United States Commercial Affairs Ministry Standard Bureau in 1997).

That is to say, concretely, the authentication key KEYCHK is generated in accordance with the following calculation expression. It is to be noted that the parentheses C ( ) in the expression represents the encoding algorithm according to the DES.

"KEYCHK"="C (SEED)"

Then, the thus-generated key KEYCHK is stored in the memory (RAM) within the authentication key generating portion 14.

Next, in step S6, it is decided whether the receiving portion 16 has received the key KEY sent from the user side key unit 2.

When it has been decided in step S6 that the key KEY is received, the processing proceeds to the next step S7 and, when it has been decided that such a key is not received, the processing is returned to immediately before the step S6, whereby such processing is repeated until it is decided that the key KEY has been received.

Next, in step S7, the correspondence deciding portion 17 compares the key KEY received from the user side key unit 2 and the authentication key KEYCHK generated in step S5 to thereby decide whether the both data are in coincidence with each other.

Here, if the user side key unit 2 is the one that is owned by a proper user, the key KEY of course coincides with the authentication key KEYCHK.

On the other hand, if the user side key unit 2 is the one owned by an improper user, for example, the key unit owned by a person who copied the key KEY in the memory of the key generating portion 22 of the user side key unit 2 prior to the execution of the present improper use, although the key KEY transmitted on from this key unit coincides with the authentication key generated in the past, such a key KEY does not coincide with the authentication data KEYCHK generated newly this time in step S5 because of the irregularity nature of the data SEED.

It is noted that, in such a case, the precision of the decision on an improper user can be enhanced by incidentally confirming that the key, which is an object to undergo the correspondence decision, coincides with the authentication key generated in the past, for example, stored in the memory of the authentication key generating portion 15.

Then, when it has been decided in step S7 that coincidence is established between these two data, that is "KEY"= "KEYCHK", the processing proceeds to step S8. When it has been decided that no coincidence is established therebetween, that is "KEY"≠"KEYCHK", the processing proceeds to step S9.

When it has been decided in step S7 that the key KEY and the authentication key KEYCHK are in coincidence with each other, the security release instructing portion 18 in step S8 sends out a security release instruction to the engine control processing portion 10 to thereby release the security of the ECU 1 constituting the vehicle control unit.

Concretely, the fuel cut flag in the memory (RAM) within the engine control processing portion 10 is changed from "1" to "0", thereby bringing the injector 41 to an operable state.

Accordingly, it results that the vehicle theft prevention device (immobilizer) of the embodiment has released the security of the vehicle, whereby the vehicle becomes usable.

Further, after the security of the vehicle has been released in step S8, the calculation process for the security control in the ECU 1 is terminated.

On the other hand, when it has been decided in step S7 that no coincidence is established between the key KEY and the authentication key KEYCHK, the processing proceeds to step S9 in that the lock-out processing portion 11 executes the lock-out of the vehicle in order to ensure the security and makes the lock-out flag "1"in the memory (EEPROM) of the lock-out processing portion 11.

Further, in such a case, after such lock-out operation has been executed in step S9, the calculation process for security control in the ECU 1 is terminated.

FIG. 4 illustrates a flow chart of the calculation process executed in the user side key unit 2 according to this embodiment.

In FIG. 4, the calculation process in the user side key unit 2 is also so set as to be automatically started at the point in time at that the ignition switch has been changed over from "off" to "on". Of course, this calculation process may be so set as to be started manually by the user.

Upon start of the calculation process in the user side key unit 2, first, it is decided in step S11 whether the receiving portion 21 of the user side key unit 2 has received the seed SEED sent from the transmitting portion 13 of the ECU 1.

When it has been decided in step S11 that the seed SEED is received, the processing proceeds to the next step S12. On the other hand, when it has not been decided that the seed SEED is received, such process is repeatedly executed until it is determined that the seed SEED has been received.

Next, in step S12, the key generating portion 22 encodes the data SEED received in step S11 by the use of the encoding algorithm the same as the encoding algorithm used by the authentication key generating portion 15 of the ECU 1 with respect to the data SEED that is an object to be encoded thereby, and thus generates a key KEY.

That is to say, concretely, this key is obtained in accordance with the following calculation expression. It is to be noted that the C ( ) in the expression represents the encoding algorithm established by the DES that was used in the authentication key generating portion 15.

"KEY"="C (SEED)"

Here, the generated key KEY is stored into the memory (RAM) of the key generating portion 22.

Then, next, in step S13, the key KEY generated in step S12 is transmitted from the transmitting portion 23 to the receiving portion 16 of the ECU 1, whereby the calculation process in the user side key unit 2 is terminated.

It is to be noted that, in this embodiment, regarding the vehicle control unit 1, although an explanation has been made about the power train control unit constituting such a vehicle control unit 1 especially by taking up the ECU independently as an example, the present invention can be also applied to a control unit for an anti lock brake system (ABS CU), a control unit for an automatic transmission (AT CU), a control unit for a 4-wheels steering system (4WS CU), a control unit for a 4-wheels driving system (4WD CU), and the like.

Although, in this embodiment, illustration has been made of an example wherein the portions coveting from the lock-out processing portion 11 to the security release instructing portion 18 are constructed integrally with regard to the vehicle control unit 1, all of such portions may of course be constructed separately from the engine control processing portion 10 or some of the lock-out processing portion 11 to the security release instructing portion 18 may be constructed separately from the engine control processing portion 10 if necessary. Of course, the constituent elements of from the lock-out processing portion 11 to the security release instructing portion 18 may be constructed separately from each other.

Also, although in this embodiment as the data used when generating the data SEED there have been used the particular engine control data such as an engine revolutions number, it is also possible to use another engine control data necessary for control of the engine and exhibiting no fixed values and irregularly change, but reliably readable. Of course, it is further possible to use vehicle control data other than such engine control data having a similar nature such as those concerned with a brake, steering, suspension, and driving system.

Also, although in this embodiment all of the data such as an engine revolutions number are added up when adding up the control data for the purpose of generating the data SEED, it is possibly sufficient only if adopting at least one of data. Even in such a case, in principle, it is possible to generate a data SEED regarded as like a random number. However, if such one data has a fixed value for backup, since the nature as a random number of the generated SEED is decreased, it is necessary to take some other factors into consideration.

Further, in this embodiment, no inconvenience of course arises even if a construction is made of deciding that the vehicle is being locked out in the case where lock-out occurred plurally in the past, by considering that the lock-out flag becomes "1" due to some error factor when deciding whether the vehicle is being locked out by the ECU 1.

Further, although in this embodiment the limitation condition of fuel system of stopping the fuel cut has been released as an example in order to release the security of the vehicle, the other limitation conditions of the fuel system may also be released or it is also possible to make setting so as to release the limitation conditions concerning an electric system such as a starter motor or ignition.

Further, although in this embodiment the portions covering from the receiving portion 21 to the transmitting portion 23 in the user side key unit 2 have been explained as an example having been constructed integrally as a one-chip element, these portions may of course be constructed separately from each other if necessary.

Further, although in this embodiment explanation has been made of an example wherein the security device for vehicle according to the present invention is applied to a vehicle theft prevention device (immobilizer), such security device can be applied also to a diagnosis device for a vehicle, a reprogramming tool for a vehicle control microcomputer of a vehicle or the like.

For example, in a case where applying the security device for vehicle according to the present invention to a diagnosis device for a vehicle, setting therefor is so performed as to release the security of the vehicle control unit with respect only to an authorized user such as a dealer of the vehicle, thereby making it possible to read in the vehicle control data constituting secret data and thereby permitting the read-in of such vehicle control data. Also, in a case where applying the security device for vehicle according to the present invention to a reprogramming tool for a vehicle control microcomputer of a vehicle, setting is so performed as to release the security of the vehicle control unit with respect only to an authorized user such as a dealer of the vehicle, thereby making it possible to rewrite the vehicle control program and thereby permitting rewrite of such vehicle control program.

What is claimed is:

1. A security device for a vehicle comprising:
   a first unit encoding a seed to generate an authentication key in accordance with a predetermined algorithm; and
   a second unit encoding said seed to generate a key in accordance with the same algorithm as said predetermined algorithm used when said first unit generates said authentication key,
   wherein said seed is generated according to vehicle control data, comparison is made between said key generated by said second unit and said authentication key generated by said first unit, and immobilization of said vehicle is released when said key and said authentication key coincide with each other.

2. A security device for vehicle according to claim 1, wherein said first unit is a vehicle control unit and said vehicle control unit includes a reading portion reading in said vehicle control data, a seed generating portion generating said seed according to said vehicle control data read into said reading portion, a transmitting portion transmitting said seed to said second unit, an authentication key generating portion encoding said seed in accordance with said predetermined algorithm to thereby generate said authentication key, a key receiving portion receiving said key from said second unit, and a correspondence deciding portion comparing said key received by said key receiving portion and said authentication key generated by said authentication key generating portion and releasing said immobilization of said vehicle when said key and said authentication key coincide with each other,
   and wherein said second unit is a user side key unit and said user side key unit includes a seed receiving portion receiving said seed transmitted from said transmitting portion of said vehicle control unit, a key generating portion encoding said seed received by said seed receiving portion in accordance with the same algorithm as said predetermined algorithm used in said authentication key generating portion of said vehicle control unit to thereby generate said key, and a key transmitting portion transmitting said key generated in said key generating portion to said key receiving portion of said vehicle control unit.

3. A security device for vehicle according to claim 2, wherein said reading portion reads in a plurality of vehicle control data and said seed generating portion generates said seed according to said plurality of vehicle control data read into said reading portion.

4. A security device for vehicle according to claim 3, wherein said seed generating portion adds up the once previously generated seed and said plurality of vehicle control data read into said reading portion to thereby generate said seed.

5. A security device for vehicle according to claim 2, wherein said vehicle control unit is a power train control unit and said vehicle control data read into said reading portion are at least one of an engine revolutions number, an amount of sucked air, a throttle opening and a water temperature.

6. A security device for vehicle according to claim 2, wherein said vehicle control unit is a power train control unit and said vehicle control data read into said reading portion includes a counted time value obtained until an ignition switch is changed over to "off" after having been made "on".

7. A security device for vehicle according to claim 2, wherein said vehicle control unit is a power train control unit and said vehicle control data read into said reading portion includes an amount of fuel injection and/or ignition energy.

8. A security device for vehicle according to claim 1, wherein comparison is made between said key generated by said second unit and said authentication key generated by said first unit and, when said key and said authentication key coincide with each other, said vehicle is brought to a usable state.

9. A security device for vehicle according to claim 1, wherein comparison is made between said key generated by said second unit and said authentication key generated by said first unit and, when said key and said authentication key coincide with each other, said vehicle control data is brought to a readable state.

10. A security device for vehicle according to claim 1, wherein comparison is made between said key generated by said second unit and said authentication key generated by said first unit and, when said key and said authentication key coincide with each other, a vehicle control program is brought to rewritable state.

11. A security device for a vehicle comprising:
    seed generation means for generating a seed according to vehicle control data;
    authentication key generating means for generating an authentication key by encoding said seed in accordance with a predetermined algorithm;
    key generating means for encoding said seed to generate a key in accordance with the same algorithm as said predetermined algorithm used when said first authentication key generating means generates said authentication key; and
    correspondence deciding means for comparing said key and said authentication key and deciding whether said key and said authentication key are in coincidence with each other,
    wherein when said correspondence deciding means decides that said key and said authentication key coincide with each other, immobilization of said vehicle is released.

12. A method of providing security for a vehicle comprising the steps of:

generating a seed according to vehicle control data;

generating an authentication key based on said seed in accordance with a predetermined algorithm at a first unit;

generating a key based on said seed in accordance with the same algorithm as said predetermined algorithm at a second unit;

comparing said key generated by said second unit and said authentication key generated by said first unit; and releasing immobilization of said vehicle when said key and said authentication key coincide with each other.

13. The method of providing security for a vehicle according to claim 12, further comprising the steps of:

reading in said vehicle control data to be used in said step of generating a seed, said step of reading in said vehicle control data being performed by a reading portion;

transmitting said seed to said second unit by a seed transmitting portion on said first unit;

receiving said seed transmitted from said seed transmitting portion by a seed receiving portion;

transmitting said key generated in said key generating portion to a key receiving portion on said first unit; and receiving said key from said second unit to be used in said step of comparing said key generated by said second unit and said authentication key generated by said first unit.

14. The method of providing security for a vehicle according to claim 13, wherein said reading portion reads in a plurality of vehicle control data and said step of generating a seed generates said seed according to said plurality of vehicle control data read into said reading portion.

15. The method of providing security for a vehicle according to claim 14, further comprising the step of adding up a once previously generated seed and said plurality of vehicle control data read into said reading portion to thereby generate said seed.

16. The method of providing security for a vehicle according to claim 13, wherein said vehicle control unit is a power train control unit and said vehicle control data read into said reading portion are at least one of an engine revolutions number, an amount of sucked air, a throttle opening and a water temperature.

17. The method of providing security for a vehicle according to claim 13, wherein said vehicle control unit is a power train control unit and said vehicle control data read into said reading portion includes a counted time value obtained until an ignition switch is changed over to "off" after having been made "on".

18. The method of providing security for a vehicle according to claim 13, wherein said vehicle control unit is a power train control unit and said vehicle control data read into said reading portion includes an amount of fuel injection and/or ignition energy.

19. The method of providing security for a vehicle according to claim 12, wherein said step of releasing immobilization of said vehicle brings said vehicle to a usable state.

20. The method of providing security for a vehicle according to claim 12, wherein said step of releasing immobilization of said vehicle brings said vehicle control data to a readable state.

21. The method of providing security for a vehicle according to claim 12, wherein said step of releasing immobilization of said vehicle brings a vehicle control program to a rewritable state.

* * * * *